US006358615B1

(12) United States Patent
Imai

(10) Patent No.: US 6,358,615 B1
(45) Date of Patent: Mar. 19, 2002

(54) RUBBER CONNECTOR

(75) Inventor: Tsuyoshi Imai, Nagano-ken (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 09/692,542

(22) Filed: Oct. 20, 2000

(30) Foreign Application Priority Data

Oct. 22, 1999 (JP) .......................................... 11-301130

(51) Int. Cl.[7] .............................. B32B 9/04; B32B 5/16

(52) U.S. Cl. ....................... 428/447; 428/448; 428/403; 428/404; 428/405; 428/406; 428/407

(58) Field of Search ................................ 428/447, 448, 428/403, 404, 407, 405, 406

(56) References Cited

U.S. PATENT DOCUMENTS 3,998,513 A 12/1976 Kobayashi et al.
4,408,814 A 10/1983 Takashi et al.
5,053,167 A 10/1991 Kawaguchi
5,229,037 A 7/1993 Nakano et al.
6,309,563 B1 * 10/2001 Iino et al. ................... 252/514

FOREIGN PATENT DOCUMENTS

EP 0 300 380 1/1989

* cited by examiner

*Primary Examiner*—Margaret G. Moore
*Assistant Examiner*—Michael J Feely
(74) *Attorney, Agent, or Firm*—Wenderoth, Lind & Ponack, L.L.P.

(57) ABSTRACT

Disclosed is a rubber connector for electrically connecting two arrays of electrode terminals on electronic circuit boards, liquid crystal display panels and the like with improved stability and reliability of electrical conduction therebetween. The connector is a silicone rubber sheet of a striped appearance prepared by slicing an alternate stratification of layers of an insulating silicone rubber and layers of an conductive silicone rubber. The most characteristic feature of the inventive connector consists in the use of a conductive silicone rubber composition comprising, instead of conventional silver particles, a specified weight or volume fraction of conductive particles of which each particle has a composite structure consisting of a core particles of an electrically non-conductive material such as silica and a metallic plating layer thereon having, preferably, a bilayered structure formed from an underplating layer of nickel and a top plating layer of gold.

15 Claims, No Drawings

RUBBER CONNECTOR

BACKGROUND OF THE INVENTION

The present invention relates to a rubber connector used for electrically connecting a liquid crystal display panel and a circuit board therefor or between two circuit boards. More particularly, the invention relates to an electric connector which is interposed between an array of electrode terminals on a first electronic board unit, e.g., liquid crystal display panel and circuit board, and an array of electrode terminals on a second electronic board unit to establish electric connection therebetween.

It is long since the debut of connectors made of a rubbery elastomer impregnated with fine metal particles or, in particular, with silver particles to impart electric conductivity as a substitute for U-formed metal wire connectors. The rubber connector of the most typical type, referred to as a "zebra" connector hereinafter, is an alternately stratified body consisting of a plurality of layers of an electroconductive rubber and a plurality of layers of an insulating rubber to exhibit a striped appearance resembling the body of a zebra. The zebra connectors are generally preferred to the U-formed metal wire connectors in respect of the stability and reliability of electric connection with little occurrence of connection failure.

One of the problems in the use of silver particles as an electro-conductive powder to impart conductivity to a rubber is that silver particles have a tendency toward agglomerate formation during storage so that difficulties are sometimes encountered in the preparation of an electroconductive rubber composition by compounding with silver particles after prolonged storage. Agglomerated silver particles can hardly be dispersed with full uniformity in the rubber matrix resulting in a decrease in the stability and reliability of the electric connection to be established by using the rubber connector.

While zebra connectors are prepared usually by slicing an alternately stratified block of conductive and insulating rubber layers in a plane perpendicular to the stratified layers, in addition, a trouble may be encountered in the molding and curing of the stratified rubber block, when the conductive rubber composition is prepared with agglomerated silver particles, that separation of layers takes place at the interface between the conductive rubber layers and insulating rubber layers or within a conductive rubber layer so that the zebra connectors of good quality can hardly be produced with stability in mass production.

SUMMARY OF THE INVENTION

The present invention accordingly has an object to provide a zebra connector which can be prepared with high productivity and inexpensiveness in any large quantities without the above described various problems and disadvantages in the prior art rubber connectors utilizing silver particles and which can be used for establishing reliable electric connection between two electronic board units each having an array of electrode terminals with stability in the conductive resistance.

Thus, the present invention provides a rubber connector which is an alternately stratified integral body consisting of a multiplicity of layers of a cured electrically conductive rubber and a multiplicity of layers of a cured electrically insulating rubber, the cured electrically conductive rubber being formed by curing an electrically conductive silicone rubber composition which comprises, as a uniform blend:

(A) 100 parts by weight of an organopolysiloxane represented by the average unit formula $$R_nSiO_{(4-n)/2}, \qquad (I)$$

In which R is an unsubstituted or substituted monovalent hydrocarbon group and the subscript n is a positive number in the range from 1.98 to 2.02, at least two of the groups denoted by R in a molecule being aliphatically unsaturated groups;

(B) from 90 to 800 parts by weight of electrically conductive particles, each particle being composed of a core particle of a non-metallic material and a plating layer of a metallic material, such as gold, on the surface of the core particle; and (C) a curing agent in an amount sufficient to effect curing of the organopolysiloxane.

It is preferable that the non-metallic material of the core particle forming the electroconductive particles (B) is silica and the plating layer of a metal is a bilayered plating layer consisting of an underplating layer of nickel and a top plating layer of gold.

DETAILED DESCRIPTION OF THE PREFERRED EMBODIMENTS

As is described above, the rubber connector of the present invention is a so-called zebra connector and the most characteristic feature thereof consists in the unique formulation of the electroconductive rubber composition to form the electroconductive rubber layers for stratification with layers of an insulating rubber.

The electroconductive rubber composition, from which the conductive rubber layers of the inventive rubber connector are formed by curing, is a silicone rubber composition and comprises, as the essential ingredients, the components (A), (B) and (C) defined above.

The component (A) in the silicone rubber composition as the first essential ingredient is an organopolysiloxane represented by the average unit formula (I) given above, in which the group denoted by R is a monovalent hydrocarbon group having 1 to 10 or, preferably, 1 to 8 carbon atoms and the subscript n is a positive number in the range from 1.98 to 2.02. It is essential that the groups denoted by R in a molecule of the organopolysiloxane include at least two aliphatically unsaturated groups such as vinyl groups.

Examples of the monovalent hydrocarbon groups denoted by R in the average unit formula (I) include alkyl groups such as methyl, ethyl, propyl, butyl, hexyl and octyl groups, cycloalkyl groups such as cyclohexyl group, alkenyl groups such as vinyl, allyl, isopropenyl, butenyl and hexenyl groups, aryl groups such as phenyl and tolyl groups and aralkyl groups such as benzyl and phenylethyl groups as well as those substituted hydrocarbon groups obtained by replacing a part or all of the hydrogen atoms in the above named groups with substituents such as halogen atoms and cyano groups exemplified by chloromethyl, 3,3,3-trifluoropropyl and 2-cyanoethyl groups, of which methyl, vinyl, phenyl and 3,3,3-trifluoropropyl groups are preferable.

While the organopolysiloxane as the component (A) contains at least two aliphatically unsaturated groups per molecule, the content of such aliphatically unsaturated groups should be in the range from 0.001 to 20% by moles or, preferably, from 0.025 to 5% by moles of the overall groups denoted by R in the average unit formula (I). The subscript n in the average unit formula (I) is a positive number in the range from 1.98 to 2.02. This means that the organopolysiloxane as the component (A) has a substantially straightly linear molecular structure.

The molecules of the organopolysiloxane as the component (A) can be constituted entirely from a single kind of diorganosiloxane units but can be constituted from two kinds or more of different diorganosiloxane units. It is further optional that the component (A) is a combination of two kinds or more of different types of organopolysiloxanes provided that each of them falls within the definition given by the average unit formula (I).

The organopolysiloxane as the component (A) has an average degree of polymerization in the range from 100 to 20000 or, preferably, from 3000 to 10000.

The component (B) as the second essential ingredient of the silicone rubber composition is an electroconductive particulate material consisting of electroconductive particles each composed of a non-metallic core particle and a metallic plating layer thereon. The non-metallic material forming the core particles includes inorganic materials and organic resinous materials. The inorganic powder suitable for the core particles include various kinds of inorganic fillers such as silica, titanium dioxide, alumina, mica, barium sulfate and carbon blacks, of which silica and alumina having, if available, a spherical particle configuration are particularly preferable.

Silica particles, i.e. silicon dioxide particles, are preferable in respect of their high heat resistance. The particle configuration thereof is not particularly limitative but should preferably be spherical because spherical particles have the smallest specific surface for the same volume area so as to save the plating amount of nickel, gold and the like. Various grades of commercial products are available for silica powders usable as such for the core particles of the electroconductive particulate material as the component (B).

When the electroconductive particulate material as the component (B) is formed from organic resinous particles as the core particles, the organic resinous material can be selected from polyolefins such as polyethylenes and polypropylenes, polystyrenes, polyvinyl chlorides, styrene/acrylonitrile copolymeric resins, acrylic resins such as polymethyl methacrylate resins, amino resins, fluorocarbon resins and nitrile-based resins, of which polymethyl methacrylate resins are preferred. These organic resinous particles also should preferably have a spherical particle configuration.

The non-metallic core particles of the electroconductive particles should have an average particular diameter in the range from 0.01 to 1000 $\mu$m or, preferably, from 0.01 to 10 $\mu$m. When the core particles are too fine with an increased specific surface area, the amount of the plating metals is correspondingly increased leading to expensiveness of the conductive particles as the component (B). When the core particles are too coarse, on the other hand, difficulties are encountered relative to the workability in compounding and uniformly dispersing the conductive particles in the matrix of the organopolysiloxane as the component (A). The core particles should preferably have a specific surface area in the range from 0.1 to 1.0 $m^2/g$.

The metallic material for forming a plating layer on the surface of the above described core particles is exemplified, though not particularly limitative, by gold, silver, nickel, palladium and copper as well as alloys based on these metals and alloys. The plating layer can be a monolayer of either one of these metals or can be a multilayer of two kinds or more of these metals and alloys. It is particularly preferable that the plating layer is a bilayer consisting of an underplating layer of nickel on the surface of the core particles and a top plating layer of gold on the underplating layer.

When improvement is desired in the adhesive bonding between the surface of the core particles and the metallic plating layer, it is advisable that the metallic plating is preceded by a coating treatment of the surface of the core particles with an organosilicon compound to interpose a layer of the organosilicon compound, referred to as a prime coating layer hereinafter, between the surface of the core particles and the metallic plating layer. Even when a prime coating layer is interposed between the surface of the core particles and the metallic plating layer, the plating layer is also preferably a multilayered plating. A particularly preferable mode of such a multilayered plating is provided by two of bilayered plating layers each consisting of an underplating of nickel and overplating of gold with intervention of a first prime coating layer between the surface of the core particles and the first bilayered plating layer and a second prime coating layer between the first and the second bilayered plating layers.

The organosilicon compound to form the prime coating layer is an organosilicon compound having reducing reactivity and can be a functional organosilane compound such as 3-aminopropyl triethoxysilane and 3-aminopropyl trimethoxysilane conventionally employed as a silane coupling agent as an adhesion improving agent. Besides, the organosilicon compound can be a polyorganosilane compound, polycarbosilane compound, organopolysiloxane compound and organopolysilazane compound. Preferably, the organosilicon compound is selected from the group consisting of the above mentioned functional organosilane compounds and polysilane compounds as well as organopolysiloxane compounds having hydrogen atoms directly bonded to the silicon atoms in the molecules, i.e. an organohydrogenpolysiloxane.

The above mentioned polysilane compound is an organosilicon polymer, of which the main chain structure is formed from Si—Si linkages, expressed by the chemical formula $$(R^2_m R^3_k X_p Si)_q, \quad \text{(II)}$$

in which $R^2$ and $R^3$ are, each independently from the other, a hydrogen atom or an unsubstituted or substituted monovalent hydrocarbon group including aliphatic, alicyclic and aromatic groups, X is the same as $R^2$ or a halogen atom, oxygen atom, nitrogen atom or an alkoxy group, the subscript m is a positive number in the range from 0.1 to 1 or, preferably, from 0.5 to 1, the subscript k is a positive number in the range from 0.1 to 1 or, preferably, from 0.5 to 1, the subscript p is 0 or a positive number not exceeding 0.5 or, preferably, not exceeding 0.2 and the subscript q is a positive number in the range from 2 to 100000 or, preferably, from 10 to 10000 with the proviso that m+k+p is in the range from 1 to 2.5 or, preferably, from 1.5 to 2.0.

The unsubstituted aliphatic or alicyclic monovalent hydrocarbon group denoted by $R^2$ or $R^3$ has up to 10 or, preferably, up to 6 carbon atoms and is exemplified by alkyl groups such as methyl, ethyl, propyl, butyl, pentyl and hexyl groups and cycloalkyl groups such as cyclohexyl group.

The unsubstituted aromatic monovalent hydrocarbon group denoted by $R^2$ or $R^3$ has 6 to 14 or, preferably, 6 to 10 carbon atoms and is exemplified by phenyl, tolyl, xylyl, naphthyl and benzyl groups.

The substituted monovalent hydrocarbon group denoted by $R^2$ or $R^3$ is obtained by replacing a part or all of the hydrogen atoms in the above named hydrocarbon groups with halogen atoms, alkoxy groups, amino groups, aminoalkyl groups and the like as exemplified by monofluoromethyl, trifluoromethyl and 3-dimethylaminophenyl groups.

The alkoxy group as the X in the formula (II) preferably has up to 4 carbon atoms and is exemplified by methoxy, ethoxy and isopropoxy groups. The halogen atom as the X in the formula (II) can be an atom of fluorine, chlorine or bromine.

The organohydrogenpolysiloxane as a class of the organosilicon compound to form the prime coating layer is an organosilicon polymer having a main chain consisting of the siloxane linkages Si—O—Si and having hydrogen atoms directly bonded to the silicon atoms as represented by the formula $$(R^4{}_aR^5{}_bH_cSiO_d)_e, \quad \text{(III)}$$

in which $R^4$ and $R^5$ are, each independently from the other, a hydrogen atom, an unsubstituted or substituted monovalent hydrocarbon group including aliphatic, alicyclic and aromatic hydrocarbon groups, an alkoxy group or a halogen atom, the subscript a is a positive number in the range from 0.1 to 1 or, preferably, from 0.5 to 1, the subscript b is a positive number in the range from 0.1 to 1 or, preferably, from 0.5 to 1, the subscript c is 0 or a positive number in the range from 0.01 to 1 or, preferably, from 0.1 to 1, the subscript d is a positive number in the range from 1 to 1.5 and the subscript e is a positive number in the range from 2 to 100000 or, preferably, from 10 to 10000 with the proviso that a+b+c is in the range from 1 to 2.5 or, preferably, from 1 to 2.2.

The above mentioned aliphatic and alicyclic monovalent hydrocarbon groups as $R^4$ and $R^5$ have 1 to 12 carbon atoms or, preferably, 1 to 6 carbon atoms including alkyl groups such as methyl, ethyl, propyl, butyl, pentyl and hexyl groups and cycloalkyl groups such as cyclohexyl group. The aromatic monovalent hydrocarbon group has 6 to 14 carbon atoms or, preferably, 6 to 10 carbon atoms including aryl and aralkyl groups such as phenyl, tolyl, xylyl, naphthyl and benzyl groups. These hydrocarbon groups can be substituted for a part or all of the hydrogen atoms therein by halogen atoms, alkoxy groups, amino groups and aminoalkyl groups as exemplified by monofluoromethyl, trifluoromethyl and 3-dimethylamino phenyl groups.

The alkoxy group has 1 to 4 carbon atoms and is exemplified by methoxy, ethoxy and isopropoxy groups, of which methoxy and ethoxy groups are preferred. The halogen atom can be an atom of fluorine, chlorine or bromine.

A prime coating layer of the above described organosilicon compound on the surface of core particles can be formed by dipping the core particles in a solution of the organosilicon compound dissolved in a solvent followed by evaporation of the solvent. The solvent usable here is exemplified by water, alcohols such as methyl and ethyl alcohols and aprotic solvents such as dimethylformamide, dimethyl sulfoxide and hexamethylphosphoric triamide, of which water is preferred if the organosilicon compound is water-soluble.

The thickness of the prime coating layer of the organosilicon compound on the core particles is in the range from 0.001 to 1 μm or, preferably, from 0.01 to 0.1 μm. When the thickness is too small, the coverage of the core particle surface with the organosilicon compound may be incomplete resulting in uneven adhesion of the metallic plating layer to the surfaces of the core particles while no particular disadvantages are caused when the thickness is too large excepting for an increase in the costs.

When a prime coating layer of the organosilicon compound is formed on the surface of the core particles, it is sometimes the case that the core particles are rendered hydrophobic or water-repellent resulting in a decrease in the affinity of the particles with the solvent to dissolve the metal salt for the metal plating treatment of the particles. Good dispersibility of the thus surface-treated core particles in the metal salt solution can be ensured to prevent a decrease in the efficiency of the metal salt reducing reaction by the addition of a surface active agent to the solution to decrease the surface tension of the solution although increased foaming of the solution is undesirable. The surface active agent can be a cationic, anionic, non-ionic or amphoteric surface active agent.

The above mentioned anionic surface active agent used here can be any one of sulfonate ester-based, sulfate ester-based, carboxylate ester-based and phosphate ester-based anionic surface active agents. The cationic surface active agent can be any one of ammonium salt-based, alkylamine-based and pyridinium-based cationic surface active agents. The amphoteric surface active agents can be any one of betaine-based, aminocarboxylate ester-based and amine oxide-based amphoteric surface active agents. The non-ionic surface active agent can be any one of ether-based, ester-based and silicone-based non-ionic surface active agents. Several commercial products of non-ionic surface active agents usable in this case include, for example, those sold under the trade names of Surfinols 104, 420 and 504 (each a product by Nisshin Chemical Industry Co.).

The amount of the surface active agent in the metal salt solution, when added, is in the range from 0.0001 to 10 parts by weight or, preferably, from 0.001 to 1 part by weight or, more preferably, from 0.01 to 0.5 part by weight per 100 parts by weight of the solution.

The core particles provided with a layer of the organosilicon compound on the particle surface are subjected to a treatment with the metal salt solution so as to deposit a metallic colloid of the metal on the layer of the organosilicon compound. The treatment is conducted by bringing the surface of the core particles after the treatment with the organosilicon compound into contact with a solution containing the metal salt. The treatment is conducted at a temperature in the range from room temperature to 70° C. for from 0.1 to 120 minutes or, preferably, from 1 to 15 minutes. In this treatment, the metal salt is reduced by the reducing reactivity of the organosilicon compound and converted into a metallic colloid on the surface of the layer of the organosilicon compound to be deposited thereon in the form of a coating film.

The metallic elements which can be converted into a metallic colloid by this treatment include palladium, gold and silver.

The solvent to dissolve the metal salt can be selected from water, ketones such as acetone and methyl ethyl ketone, alcohols such as methyl and ethyl alcohols and aprotic polar solvents such as dimethyl formamide, dimethyl sulfoxide and hexamethyl phosphoric triamide.

The concentration of the metal salt in the metal salt solution should be at least 0.01% by weight and up to the solubility limit of the salt in the solvent depending on the solvents or, preferably, in the range from 0.01 to 20% by weight or, more preferably, in the range from 0.1 to 5% by weight. When the concentration of the salt is too low, deposition of the metallic colloid on the particle surface may eventually be incomplete.

When the particles are provided with a layer of the metal colloid deposited thereon, the particles can be subjected to electroless plating of nickel by utilizing the catalytic activity of the metal colloid. The electroless nickel plating solution, which can be a commercially available product, contains, usually, a water-soluble nickel salt such as nickel sulfate and nickel chloride, reducing agent such as sodium hypophosphite, hydrazine and sodium borohydride and complex-forming agent such as sodium acetate, phenylene diamine and sodium potassium tartrate.

The electroless nickel plating treatment of particles can be conducted by a batch process in which the powder is added to the electroless plating solution under agitation or the solution-adding process in which the plating solution is added dropwise into an aqueous dispersion of the particles in water. The nickel plating layer thus formed should have a thickness in the range, preferably, from 0.01 to 10 μm or, more preferably, from 0.1 to 2 μm. When the thickness of the nickel plating layer is too small, coverage of the particle surface with the nickel plating layer would be incomplete. When the thickness is too large, on the other hand, the weight of the particles is unduly increased due to the increased amount of coating eventually to cause a problem in compounding with a rubber.

It is preferable that the above described electroless nickel plating treatment is followed by a plating treatment with gold to form a bilayered plating layer consisting of an underplating layer of nickel and a top plating layer of gold. The gold plating treatment can be conducted according to a known procedure either as an electrolytic plating treatment or as an electroless plating treatment, of which electroless plating is preferable. The plating solution of gold can be prepared according to the known formulation or can be obtained as a commercially available product.

The plating layer of gold should have a thickness in the range, preferably, from 0.001 to 1 μm or, more preferably, from 0.01 to 0.1 μm. When the thickness of the gold plating layer is too small, the volume resistivity of the conductive rubber composition compounded with the particles cannot be low enough while, when the thickness is too large, an undue increase in the costs is caused due to expensiveness of gold.

The electroconductivity-imparted particles should have a volume resistivity not exceeding 0.1 ohm-cm or, preferably, not exceeding 0.01 ohm-cm or, more preferably, not exceeding 0.005 ohm-cm.

The electroconductivity-imparted particles are compounded with a rubber compound to form a conductive rubber composition in a volume fraction in the range from 25 to 75% or, preferably, from 30 to 60%. When the volume fraction thereof is too low, the volume resistivity of the rubber composition compounded with the conductive particles cannot be low enough while, when the volume fraction is too high, difficulties are encountered in compounding of the conductive particles with the rubber compound.

The compounding amount of the conductive particles with the rubber composition can also be defined in terms of the weight proportion, Namely, the compounding amount of the conductive particles should be in the range from 90 to 800 parts by weight or, preferably, from 100 to 500 parts by weight per 100 parts by weight of the organopolysiloxane as the principal ingredient in the silicone rubber compound.

The third essential ingredient, i.e. component (C), in the silicone rubber composition is a curing agent which can be a catalyst combination of an organohydrogenpolysiloxane and a platinum catalyst or an organic peroxide. The platinum catalyst for the hydrosilation reaction can be a platinum in the elementary form, chloroplatinic acid, addition products of chloroplatinic acid with an alcohol and complex compounds of chloroplatinic acid with an aldehyde, ether or olefin compound. The amount of the platinum compound is in the range from 1 to 2000 ppm by weight as platinum element based on the amount of the organopolysiloxane as the component (A).

The organohydrogenpolysiloxane as the counterpart to form the catalyst combination has at least two hydrogen atoms directly bonded to the silicon atoms in a molecule. Although the molecular structure is not particularly limitative including straightly linear, branched and cyclic structures, the organohydrogenpolysiloxane preferably has a degree of polymerization not exceeding 300 and should be represented by the average unit formula $$R^6_fH_gSiO_{(4-g-g)/2}, \quad (IV)$$

In which $R^6$ is an unsubstituted or substituted monovalent hydrocarbon group exemplified by the same groups given as the examples of the group $R^1$ having, preferably, no aliphatically unsaturated bonds, the subscripts f and g are each 0 or a positive number smaller than 3 with the proviso that f+g is a positive number smaller than 3.

Particular examples of the organohydrogenpolysiloxane include copolymers of dimethylsiloxane units and methylhydrogensiloxane units terminated at each molecular chain end with a dimethylhydrogensilyl group, copolymers of dimethylsiloxane units and methylhydrogensiloxane units terminated at each molecular chain end with a trimethylsilyl group, low-viscosity fluid consisting of the $(CH_3)_2HSiO_{0.5}$ units and $SiO_2$ units, 1,3,5,7-tetramethyl cyclotetrasiloxane, 1-propyl1,3,5,7-tetramethyl cyclotetrasiloxane and 1,5-dihexyl-1,3,5,7-tetramethyl cyclotetrasiloxane.

The amount of the organohydrogenpolysiloxane as a part of the curing agent in the silicone rubber composition should be sufficient to provide the silicon-bonded hydrogen atoms in a molar amount of 50 to 500% based on molar amount of the alkenyl groups in the organopolysiloxane as the component (A).

Examples of the organic peroxides as an alternative class of the curing agent include benzoyl peroxide, 2,4-dichlorobenzoyl peroxide, 4-methylbenzoyl peroxide, 2-methylbenzoyl peroxide, 2,4-dicumyl peroxide, 2,5-dimethyl bis(2,5-tert-butylperoxy) hexane, di-tert-butyl peroxide and tert-butyl perbenzoate.

These organic peroxides are compounded in the silicone rubber composition in an amount in the range from 0.1 to 5 parts by weight per 100 parts by weight of the organopolysiloxane as the component (A).

It is optional with an object to improve the mechanical properties of the cured silicone rubber that the silicone rubber composition is blended with a reinforcing silica filler having a specific surface area of at least 50 $m^2/g$ or, preferably, in the range from 100 to 300 $m^2/g$. The reinforcing silica filler can be a fumed silica filler or a precipitated silica filler optionally after a surface treatment of the silica particles with a chlorosilane compound or hexamethyl disilazane to render the surface hydrophobic.

The amount of the reinforcing silica filler compounded in the silicone rubber composition is in the range from 3 to 70 parts by weight or, preferably, from 10 to 50 parts by weight per 100 parts by weight of the organopolysiloxane as the component (A). When the amount of the reinforcing silica filler is too small, the desired effect of reinforcement on the mechanical properties of the cured silicone rubber can hardly be accomplished as a matter of course while compounding of the filler in a too large amount results in degradation of the workability of the composition along with a decrease in the mechanical strengths of the cured silicone rubber.

In addition to the above described specific electroconductive powders and the reinforcing silica fillers, it is optional that the silicone rubber composition is compounded with other electroconductive and non-conductive powders including electroconductive carbon blacks, electroconductive zinc oxide, electroconductive titanium dioxide, silicon rubber powders, iron oxides, ground quartz powders and calcium carbonate.

It is of course optional that the silicone rubber composition is compounded with a variety of known additives such as coloring agents, heat stability improvers, reaction moderators, mold release agents, dispersing agents for the filler and so on each in a limited amount. Examples of the above mentioned dispersing agent for fillers include diphenylsilane diol and various kinds of alkoxysilane compounds, so called carbon-functional silane compounds and silanol group-containing low molecular weight organopolysiloxanes.

When the silicone rubber composition used in the present invention is desired to be imparted with fire resistance or flame retardancy, such an effect can be accomplished by the addition of a known additive such as platinum compounds, combinations of a platinum compound and titanium dioxide, manganese carbonate or γ-iron oxide, ferrites, mica flakes, glass fibers and glass flakes.

Further, when the cured silicone rubber in the present invention is desired to have a cellular or porous structure, the silicone rubber composition can be compounded with an inorganic or organic blowing agent. Examples of the organic blowing agent include azobisisobutyronitrile, dinitropentamethylene tetramine, benzenesulfone hydrazide and azodicarbonamide. The amount of these blowing agents in the silicone rubber composition is in the range from 1 to 10 parts by weight per 100 parts by weight of the organopolysiloxane as the component (A) depending on the desired degree of porosity.

The silicone rubber composition used in the present invention can be prepared by uniformly blending the above described essential and optional ingredients by using a suitable rubber processing machine such as two-roller mills, Banbury mixers, kneaders and the like. When adequately formulated, the volume resistivity of the silicone rubber composition thus obtained can be not exceeding 1 ohm-cm or, in particular, not exceeding 0.1 ohm-cm.

The silicone rubber composition can be molded and cured into any desired form depending on the intended application of the rubber connectors by a known molding method such as metal-mold compression molding, extrusion molding and calendering. The general conditions for curing of the silicone rubber composition include a temperature of 80 to 400° C. and a length of time of 10 seconds to 30 days depending on various parameters including the wall thickness of the molded body.

The rubbery polymer to form the insulating rubber layers in the inventive rubber connectors is not limited to a silicone rubber composition provided that the rubber is stable in the form without spontaneous deformation and free from plastic deformation after curing. Examples of suitable rubbery polymers include natural rubber as well as synthetic rubbers such as styrene/butadiene copolymeric rubbers, acrylonitrile/butadiene copolymneric rubbers, acrylonitrile/butadiene/styrene copolymeric rubbers, ethylene/propylene copolymeric rubbers, ethylene/propylene/diene ternary copolymeric rubbers, polychloroprene rubbers, silicone rubbers, butadiene rubbers, isoprene rubbers, chlorosulfonated polyethylene rubbers, polysulfide rubbers, butyl rubbers, fluorocarbon rubbers, urethane rubbers and polyisobutyl rubbers, thermoplastic elastomers such as polyester elastomers, plasticized polyvinyl chloride resins, vinyl acetate-based resins and copolymers of vinyl chloride and vinyl acetate, of which silicone rubbers are preferred because they are excellent in the aging characteristics, electric properties, heat resistance, permanent compression set and molding workability.

The organopolysiloxane as the principal ingredient in the silicone rubber composition can be a dimethylpolysiloxane, methylphenylpolysiloxane or methylvinylpolysiloxane as well as a halogenated organopolysiloxane imparted with an appropriate rheological property by compounding with a filler such as silica fillers.

The procedure for the preparation of the inventive rubber connector by using the above described electroconductive and insulating silicone rubber compositions is well known in the art. Namely, the rubber compositions are each shaped into thin sheets of an appropriate thickness and the sheets are alternately stacked one on the other into a block followed by compression of the block under heating to give a cured rubber block having a stratified structure which is sliced in a plane perpendicular to the layers of the stacked rubber sheets into sheets of striped appearance which can be used as the rubber connector. Lamination of the sheets of the respective rubber compositions can be conducted by any known molding methods including the printing method and calendering method, of which the calendering method is preferred in respect of the good productivity and stability of the process.

For example, a layer of the insulating rubber is formed on a polyethylene terephthalate film by the method of calendering followed by heating to effect curing of the rubber composition and then a layer of the conductive rubber composition is formed on the thus cured insulating rubber layer also by the calendering method. The thus obtained two-layered rubber sheet is separated from the polyethylene terephthalate film and a large number of these bilayered rubber sheets are stacked one on the other in a face-to-back fashion to give a stratified block which is then cured by heating under compression and sliced into sheets of striped appearance.

It is preferable that the rubber connector of the invention prepared in this way has a rubber hardness in the range from 50 to 80° H. or, more preferably, from 60 to 80° H. in order to ensure good and uniform electric connection between the electrode terminals of an electronic circuit board and the conductive rubber layers of the connector with stability even when compressive deformation of the rubber connector is very small to be only 2 to 10% and to be almost free from the trouble of buckling. This condition is important in order to decrease the load on the instruments constructed by using the rubber connector enabling a compact and light-weight design of the electronic instruments. The above mentioned rubber hardness can be determined according to the testing procedure specified in JIS K 6253 or ISO 7619.

In the following, the rubber connector according to the present invention is described in more detail by way of Examples and Comparative Examples.

EXAMPLE 1

An insulating silicone rubber compound (KE 971 U, a product by Shin-Etsu Chemical Co.) compounded with a curing agent (C-19A/B, a product by the same company supra) was sheeted in a thickness of 0.03 mm by calendering on a polyethylene terephthalate (PET) film of 0.5 mm thickness followed by heating in an oven at 200° C. to give a cured layer of the insulating silicone rubber.

Separately, a 100 g portion of spherical silica particles having an average particle diameter of 10 μm (US-10, a product by Mitsubishi Rayon Co.) was added to a solution prepared by dissolving 5 g of a phenyl hydrogen polysilane (PPHS) in 65 g of toluene and kept therein for 1 hour under agitation followed by removal of the toluene by evaporation under a reduced pressure of 45 mmHg at 80° C. to give dried PPHS-treated spherical silica particles which were hydrophobic and could float on the surface of water. A 100 g portion of the PPHS-treated spherical silica particles was added to 50 g of a 0.5% by weight aqueous solution of a surface active agent (Surfinol 504, supra) and dispersed therein by agitation. The particles were then subjected to a palladium treatment by adding, to the above obtained aqueous dispersion of the particles, 70 g of a 1% by weight aqueous solution of palladium chloride $PdCl_2$ followed by agitation for 30 minutes and then filtration, washing with water and drying to give spherical silica particles bearing palladium colloid deposited on the surface.

The thus obtained palladium-treated silica particles were dispersed in 100 g of a reducing nickel plating bath containing sodium hypophosphite, sodium acetate and glycine in amounts of 2.0 moles, 1.0 mole and 0.5 mole, respectively, together with a small amount of a silicone-based defoaming agent (KS 538, a product by Shin-Etsu Chemical Co.) followed by drop-wise addition of an aqueous solution of 2.0 moles of sodium hydroxide carried by air and then an aqueous solution of 1.0 mole of nickel sulfate carried by nitrogen gas under agitation to deposit a plating layer of nickel on the particle surface. The thickness of the nickel plating layer thus deposited could be estimated to be 0.25 μm.

The nickel-plated silica particles obtained in the above described manner were dispersed in 100 g of a commercially available gold plating solution (K-24 N, a product by High-Purity Chemistry Laboratory) to deposit a gold plating layer of 0.03 μm thickness. The thus gold-plated silica particles had a specific surface area of 0.4 $m^2/g$ and a density of 2.39 $g/cm^3$.

An electroconductive silicone rubber composition was prepared by uniformly blending 300 parts by weight of the above prepared goldplated spherical silica particles with 100 parts by weight of an organopolysiloxane gum having an average degree of polymerization of about 8000 and consisting of 99.85% by moles of dimethylsiloxane units and 0.15% by moles of methylvinylsiloxane units to give a base blend which was further admixed with 0.4% by weight of dicumyl peroxide as a curing agent (C-8, a product by Shin-Etsu Chemical Co.). The volume fraction of the gold-plated silica particles in the electroconductive silicone rubber composition was 56%. The electroconductive silicone rubber composition had a volume resistivity of $2\times10^{-2}$ ohm-cm.

This electroconductive silicone rubber composition was sheeted by calendering in a thickness of 0.03 mm onto the insulating silicone rubber layer supported by the PET film followed by peeling of the bilayered silicone rubber laminate from the supporting PET film. A large number of the bilayered silicone rubber laminates were stacked one on the other in a face-to-back fashion to give a block having a structure of stratification which was subjected to a heat treatment under compression for primary curing at 165° C. for 10 hours followed by slicing of the block in a plane perpendicular to the silicone rubber layers into sheets having striped appearance. The primary-cured silicone rubber sheets were subjected to a secondary curing treatment in an oven at 120° C. for 1 hour into fully cured silicone rubber sheets having a rubber hardness of 60° H. according to the testing procedure specified in JIS K 6253 which were cut into the dimensions of individual rubber connectors.

EXAMPLE 2

Rubber connectors were prepared in substantially the same manner as in Example 1 except that the electroconductive silicone rubber composition was prepared by decreasing the amount of the gold-plated silica-based conductive particles from 300 parts by weight to 250 parts by weight. The volume fraction of the gold-plated silica particles in the electroconductive silicone rubber composition was 47%. The electroconductive silicone rubber composition had a volume resistivity of $5\times10^{-2}$ ohm-cm.

EXAMPLE 3

Rubber connectors were prepared in substantially the same manner as in Example 1 except that the electroconductive silicone rubber composition was prepared by replacing the silica-based nickel/gold-plated conductive particles with the same amount of spherical nickel/gold-plated alumina particles prepared from a commercial product of alumina of which the primary particles had an average particle diameter of 20 nm and a specific surface area of 100 $m^2/g$ (Oxide C, a product by Nippon Aerosil Co.). The volume fraction of the goldplated alumina particles in the electroconductive silicone rubber composition was 48%. The electroconductive silicone rubber composition had a volume resistivity of $3\times10^{-2}$ ohm-cm.

EXAMPLE 4

Rubber connectors were prepared in substantially the same manner as in Example 1 except that the electroconductive silicone rubber composition was prepared by replacing 300 parts by weight of the silica-based nickel/gold-plated conductive particles with 250 parts by weight of resin-based spherical conductive particles prepared from a commercial product of polymethyl methacrylate resin particles having an average particle diameter of 1 μm. The volume fraction of the gold-plated resin particles in the electroconductive silicone rubber composition was 52%. The electroconductive silicone rubber composition had a volume resistivity of $1\times10^{-2}$ ohm-cm.

Comparative Example 1

The procedure for the preparation of rubber connectors was undertaken in substantially the same manner as in Example 1 except that the electroconductive silicone rubber composition was prepared by decreasing the amount of the silica-based nickel/gold-plated conductive particles from 300 parts by weight to 70 parts by weight. The volume fraction of the nickel/gold-plated silica particles in the electroconductive silicone rubber composition was 23%. The thus prepared silicone rubber composition had no electroconductivity but was insulating so that no usable rubber connectors could be obtained.

Comparative Example 2

Rubber connectors were prepared in substantially the same manner as in Example 1 except that the electroconductive silicone rubber composition was prepared by replacing 300 parts by weight of the silica-based conductive particles with 450 parts by weight of a silver powder. The electroconductive silicone rubber composition had a volume resistivity of $5\times10^{-4}$ ohm-cm. The rubber connectors, however, were not suitable for practical applications due to eventual exfoliation at the interfaces between the insulating rubber layers and electroconductive rubber layers in addition to the problems relative to poor workability in the preparation of a silver powder-loaded silicone rubber composition by dispersing the silver particles in the organopolysiloxane.

Comparative Example 3

Rubber connectors were prepared in substantially the same manner as in Example 1 except that the electroconductive silicone rubber composition was prepared by replacing 300 parts by weight of the silica-based conductive particles with the same amount of a commercial product of silver-plated glass beads (S-5000S-3, a product by Toshiba Palotini Co.). The electroconductive silicone rubber composition had a volume resistivity of $1 \times 10^{-4}$ ohm-cm. The rubber connectors, however, were not suitable for practical applications for the same reasons as in Comparative Example 2.

What is claimed is:

1. A rubber connector which is an alternately stratified integral body consisting of a multiplicity of layers of a cured electrically conductive rubber and a multiplicity of layers of a cured electrically insulating rubber, the cured electrically conductive rubber being formed by curing an electrically conductive silicone rubber composition which comprises, as a uniform blend:

(A) 100 parts by weight of an organopolysiloxane represented by the average unit formula $$R_nSiO_{(4-n)/2},$$

In which R is an unsubstituted or substituted monovalent hydrocarbon group and the subscript n is a positive number in the range from 1.98 to 2.02, at least two of the groups denoted by R in a molecule being aliphatically unsaturated groups;

(B) from 90 to 800 parts by weight of electrically conductive particles, each particle being composed of a core particle of a non-metallic material and a plating layer of a metallic material on the core particles; and (C) a curing agent in an amount sufficient to effect curing of the organopolysiloxane as the component (A).

2. The rubber connector as claimed in claim 1 in which the plating layer of a metal in the electrically conductive particles is bonded to the surface of the core particle with intervention of a layer of an organosilicon compound.

3. The rubber connector as claimed in claim 2 in which the organosilicon compound is a phenylhydrogenpolysilane compound.

4. The rubber connector as claimed in claim 2 in which the layer of an organosilicon compound has a thickness in the range from 0.001 to 1 μm.

5. The rubber connector as claimed in claim 1 in which the plating layer of a metallic material on the core particles of the electrically conductive particles has a bilayered structure consisting of an underplating layer of nickel and a top plating layer of gold.

6. The rubber connector as claimed in claim 5 in which the underplating layer of nickel has a thickness in the range from 0.01 to 10 μm.

7. The rubber connector as claimed in claim 5 in which the top plating layer of gold has a thickness in the range from 0.001 to 1 μm.

8. The rubber connector as claimed in claim 1 in which the core particles of the electrically conductive particles have a specific surface area in the range from 0.1 to 1.0 $m^2/g$.

9. The rubber connector as claimed in claim 1 in which the volume fraction of the electrically conductive particles in the electrically conductive silicone rubber composition is in the range from 25 to 75%.

10. The rubber connector as claimed in claim 9 in which the volume fraction of the electrically conductive particles in the electrically conductive silicone rubber composition is in the range from 30 to 60%.

11. The rubber connector as claimed in claim 1 in which the core particle of the electrically conductive particles is a particle of silica or alumina.

12. The rubber connector as claimed in claim 1 in which the core particles of the electrically conductive particles have an average particle diameter in the range from 0.01 to 1000 μm.

13. The rubber connector as claimed in claim 1 in which the curing agent is an organic peroxide or a combination of an organohydrogenpolysiloxane and a platinum compound.

14. The rubber connector as claimed in claim 1 in which the amount of the curing agent is such that the cured silicone rubber composition has a rubber hardness in the range from 50 to 80° H.

15. The rubber connector as claimed in claim 1 in which the electrically insulating rubber is an electrically insulating silicone rubber.

* * * * *